United States Patent [19]

Erath

[11] Patent Number: 5,458,530

[45] Date of Patent: Oct. 17, 1995

[54] DEVICE FOR PRODUCING DRILLED HOLES WITH UNDERCUT

[75] Inventor: Herbert Erath, Waldachtal-Salzstetten, Germany

[73] Assignee: Fischerwerke Artur Fischer GmbH & Co KG, Waldachtal, Germany

[21] Appl. No.: 254,948

[22] Filed: Jun. 7, 1994

[30] Foreign Application Priority Data

Jul. 10, 1993 [DE] Germany .......................... 43 23 102.0

[51] Int. Cl.[6] ............................................... B24B 33/00
[52] U.S. Cl. ................................... 451/211; 451/135
[58] Field of Search ..................... 451/221, 119, 451/121, 135, 231, 236

[56] References Cited

U.S. PATENT DOCUMENTS

| 2,802,320 | 8/1957 | Nagle | 451/211 |
|---|---|---|---|
| 3,022,608 | 2/1962 | Tree | 451/211 |
| 3,443,399 | 5/1969 | Pope et al. | 451/119 |
| 3,510,995 | 5/1970 | Michel | 451/211 |
| 3,641,710 | 2/1972 | Heinelt | 451/211 |
| 4,143,489 | 3/1979 | Sogner | 451/211 |
| 4,646,476 | 3/1987 | Yui | 451/211 |
| 4,798,024 | 1/1989 | Grimm | 451/211 |

FOREIGN PATENT DOCUMENTS

| 0087085 | 8/1983 | European Pat. Off. . |
|---|---|---|
| 0142611 | 5/1985 | European Pat. Off. . |
| 3704491 | 8/1988 | Germany . |
| 4004485 | 8/1991 | Germany . |
| 4119350 | 5/1992 | Germany . |
| 4127745 | 2/1993 | Germany . |
| 333067 | 5/1972 | U.S.S.R. . |

*Primary Examiner*—Maurina T. Rachuba
*Attorney, Agent, or Firm*—Michael J. Striker

[57] ABSTRACT

A device for producing drilled holes with an undercut has a swivel bearing, a drill shank mounted in the swivel bearing, swivelling means displacing the drill shank in a gyratory movement about a center line of drilling, a displacement element projecting at one side from the swivel bearing and displacing the drill shank against a resilient restoring force, and a ring around which the displacement element moves.

5 Claims, 3 Drawing Sheets

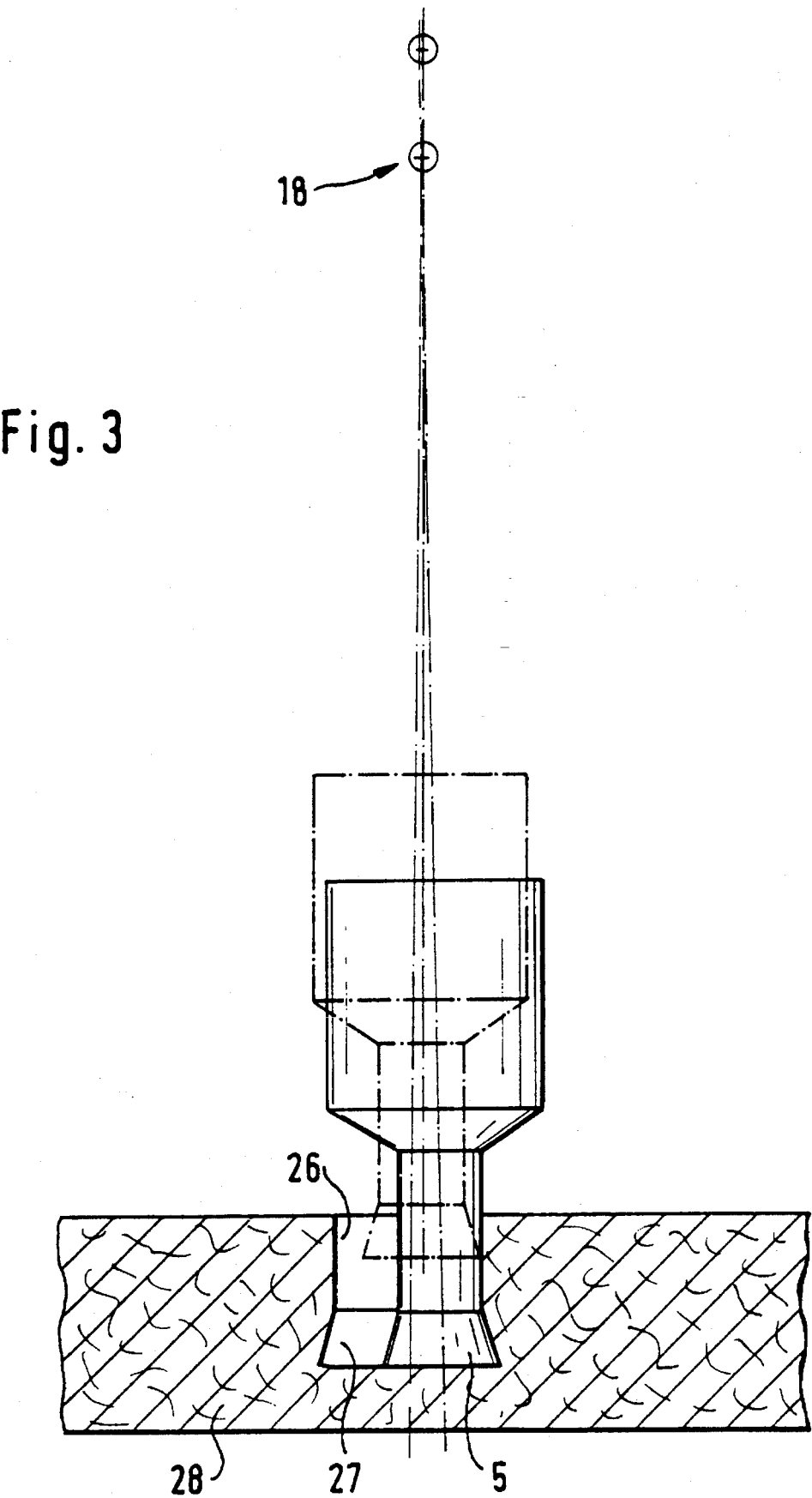

1

DEVICE FOR PRODUCING DRILLED HOLES WITH UNDERCUT

BACKGROUND OF THE INVENTION

The present invention relates to a device for producing drilled holes with an undercut.

More particularly, it relates to such a device which is used for producing drilled holes with an undercut in facing panels of ceramics, stone, concrete or similar materials and has a drill shank mounted in a swivel bearing and swivelling means for displacing the drill shank into a gyratory movement about a central line of drilling.

Devices of the above mentioned general type are known in the art. In order to produce drilled holes with an undercut, such a device has a bearing bush provided with a concave depression in which a drilling tool with a collar is supported and mounted so as to swivel. During swivelling out of the drilling tool and simultaneously performing a stirring movement, the lateral cutting edges of the drilling tool ream out and undercut in the region of the bottom of the drilled hole. An expansible plug with an expansible sleeve can be inserted into the thusly formed undercut with an interlocking fit.

The above described drilled holes with an undercut can also be made in facing panels or similar structures. But in this case the undercuts have to be made very exactly so that when an expansible anchor is inserted and expanded, the expansion pressure is not too great. The reason is that too great an expansion pressure can result in a part of the facing panel breaking away. In order to produce an exact undercut, the above mentioned tools are designed so that an automatic machine-controlled swivelling-out action can be performed. Furthermore, drilling tools with a drilling head set with diamond chips are used. When the drilling tool clamped in alignment with the drive axis of the driving machine is inserted into the facing panel, the entire end face of the drilling head having the shape of a truncated cone comes into engagement with the panel. This requires a high application pressure of the drilling tool, which leads to premature blunting of the diamond chips due to the low cutting speed at the center of the end face of the drilling tool. As a result, the service life of the drilling tool is considerably reduced.

The German document DE-A1 41 19 350.4 discloses a device for producing drilled holes with an undercut in facing panels in which the drilling machine and therefore the drill bit attached to it for producing the undercut are displaced away from the center line and positively guided along a cam plate during the reaming-out operation. Swivelling is provided by hand and for this reason the gyratory movement of the drill bit during the reaming out operation has only a low speed.

SUMMARY OF THE INVENTION

Accordingly, it is an object of the present invention to provide a device for producing drill holes with an undercut, which avoids the disadvantages of the prior art.

More particularly, it is also an object of the present invention to provide a device for reducing drilled holes with an undercut, in which the gyratory movement required for reaming out an undercut is performed by a machine itself.

In keeping with these objects and with others which will become apparent hereinafter, one feature of the present invention resides, briefly stated, in a device for producing drilled holes with an undercut in which a displacement element projecting into one side from the bearing of the drill shank displaces the drill shank against the resiliently restoring force of rubber bearings or other resilient elements from the center line of drilling, and the displacement element moves around on a ring.

In the device in accordance with the present invention the drill shank can be displaced out of its vertical position by means of the displacement element acting on the bearing of the drilled shank and the displacement element moves around on a ring, so that the bearing and consequently the drill shank located in it are displaced in a gyratory movement. The amplitude of the displacement can be adjusted in a simple manner by changing the vertical position of the ring or the displacement element. The adjustment of the displacement can be changed during the drilling operation so that once a desired depth of the drilled hole has been reached, the reaming out operation can be started straight away. In order to produce the drilled hole it is advantageous if first of all drilling is performed by a slight gyratory movement and once the depth of the drilled hole has been reached the gyratory movement is increased to ream out the undercut. As the undercut is being reamed out, the drill bit does not advance any further.

Since the gyratory movement is continuous during the drilling operation, the drilling can be carried out with less force and therefore also in a manner less likely to damage the material. Without such gyratory movement, the cutting speeds occurring at the center of the drilling head set with diamond chips are slow and lead to premature blunting of the diamond chips.

In accordance with a further feature of the present invention the displacement element preferably rotates at a lower speed than the drill shank. Also, the drill shank and the displacement element can be driven by separate drive motors. However, it is more advantageous to provide a common drive which drives the drill shank and the displacement element at different speeds by belts or toothed gears. A common drive can be made more compact, weighs less and costs less. The lower weight is especially advantageous for producing a gyratory movement, since a lower mass contributes to the fact that high gyratory speeds can be achieved.

In accordance with another feature of the present invention, the displacement element preferably projects from a rotatable ring which encircles the drill shank. To produce the gyratory movement, the rotatable ring is caused to rotate, the displacement element projecting from it swivelling the swivel-mounted drill shank from its vertical position.

The displacement element can be formed as a roller or a bearing element mounted on the ring, for example a four-point bearing. Such a four-point bearing is capable of being operated with considerably less wear than a roller. However, the displacement element formed as a roller is less expensive to manufacture.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view illustrating a process of producing a drilled hole with an undercut in a facing panel by the inventive device.

DESCRIPTION OF THE PREFERRED EMBODIMENTS

Figure 1:
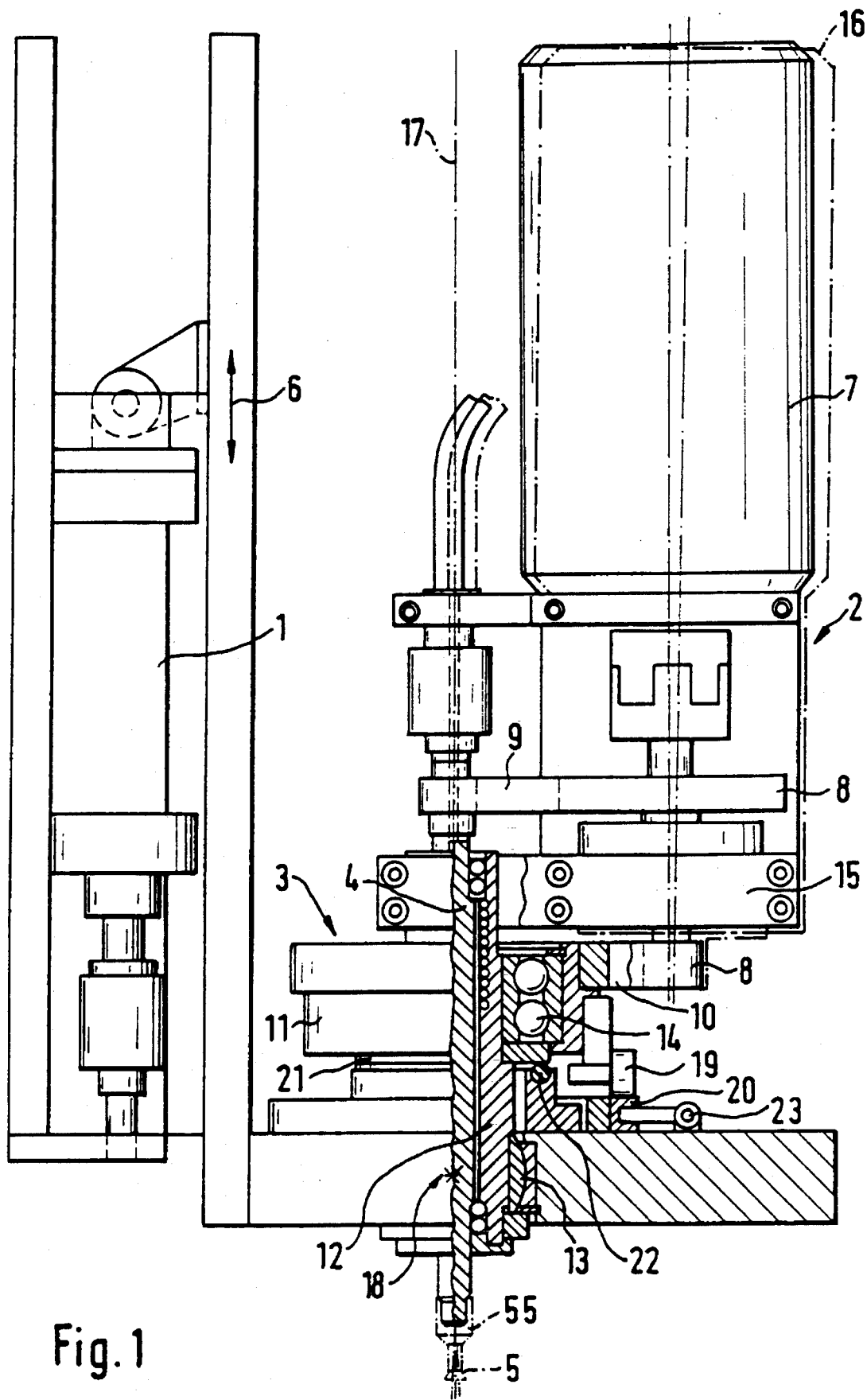
FIG. 1 is a view showing a device for producing drilled holes with an undercut in accordance with the present invention, provided with a displacement element formed as a roller.

A device for producing drilled holes with an undercut in accordance with the present invention as shown in FIG. 1 has a forward feed unit 1, a drive unit 2, and a drill shank 4 mounted in a swivelling assembly 3.

The forward feed unit 1 moves the drive unit 2 together with the swivelling assembly 3 and the drill shank 4 in a vertical direction, in order to lower a drilling head 5 to produce a drilled hole and then to remove it from the hole. The vertical feed movement is identified by a double-ended arrow 6.

The drive unit 2 includes a drive motor 7 and a belt drive 8 which drives the drill shank 4 by a belt 9 and drives a rotatable ring 11 by a belt 10.

The drive shank 4 is arranged in a bearing sleeve 12 which is mounted in a swivel bearing 13. The rotatable ring 11 is mounted on the bearing sleeve 10 by a ball-race bearing 14. By a carrier 15, the bearing sleeve 12 supports the whole drive unit 2 which is thus swivel-mounted, similarly to the drill shank 4, in the swivel bearing 13. The swivel range is identified by broken lines 16. The center line 17 of drilling extends through a bearing mid point 18 of the swivel bearing 13, so that the drill shank 4 can be displaced and swivelled.

A displacement element is provided for displacing the drill shank 4. The displacement element in this embodiment is formed as a roller 19 which projects laterally from the rotatable ring 11 and presses from above against a vertically adjustable ring 20. The rotatable ring 11 is thus raised at one side, so that the entire arrangement including the drills hank 4 and the drive unit 2 is slightly tilted in the swivel bearing 13. A bearing flange 21 secured to the bearing bush 12 lies on a rubber bearing 22 formed as an O-ring. Therefore a resilient displacement of the bearing bush 12 and the drill shank 4 mounted in it is provided.

The ring 20 is vertically adjustable in order to obtain a larger or smaller displacement and therefore a larger or smaller gyratory movement at the drilling head 5. For providing the vertical adjustment, a cylinder-piston unit 23 acts on the ring 20.

Figure 2:
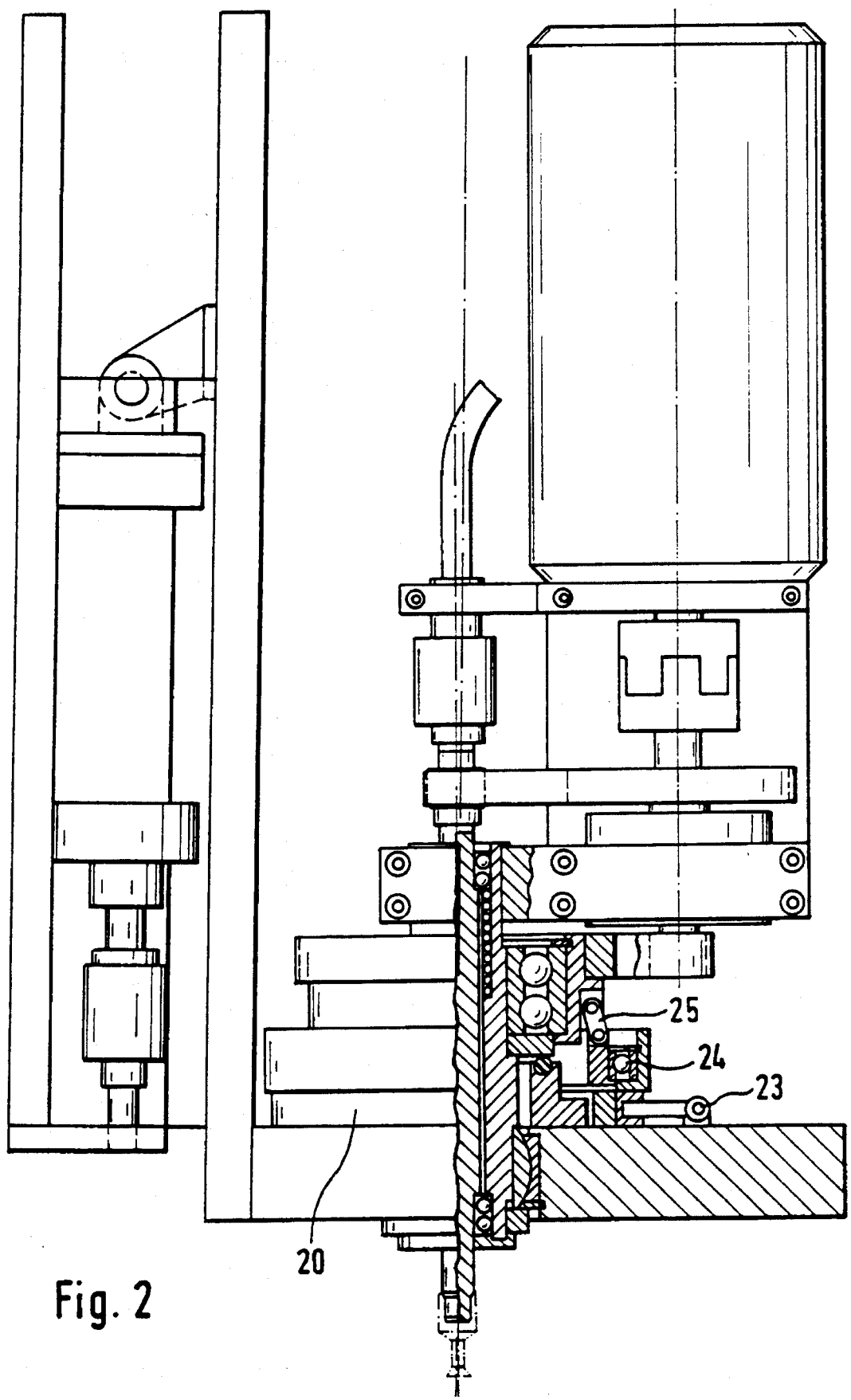
FIG. 2 is a view showing the inventive device with a displacement element formed as a four-point bearing.

In the embodiment shown in FIG. 2 the displacement element is formed as a bearing element 24. In particular, the bearing element 24 is formed as a four-point bearing and is connected by a lever 25 to the rotatable ring 11. In this embodiment also the vertical adjustment is provided by the cylinder-piston unit 23 which acts on the vertically adjustable ring 20.

The process of reaming out of a drilled hole 26 with an undercut 27 in a facing panel 24 is shown in FIG. 3. The drilling head 5 with diamond chips covering its end face and its conical outer surface is used for this purpose. The undercut 27 is reamed out by a gyratory movement about the bearing mid point 18. The cylindrical portion of the drilled hole 26 is produced with a gyratory movement. However, this movement has a smaller amplitude than the gyratory movement used to ream out the undercut 27. In addition, the forward feed for the drilling head 5 is switched off as the undercut 27 is being reamed out.

It should be mentioned that the drilling head 5 is a part of a drilling tool 55 shown in FIG. 1 known per se, which is connected to the drill shank 4.

It will be understood that each of the elements described above, or two or more together, may also find a useful application in other types of constructions differing from the types described above.

While the invention has been illustrated and described as embodied in a device for producing drilled holes with undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A device for producing drilled holes with an undercut, comprising a swivel bearing; a drill shank mounted in said swivel bearing; swivelling means displacing said drill shank in a gyratory movement about a center line of drilling; a displacement element projecting at one side from said swivel bearing and displacing said drill shank against a resilient restoring force, said displacement element being vertically adjustable; means for vertically adjusting said displacement element; a ring around which said displacement element moves; a resilient element providing said resilient restoring force against which said displacement element displaces said drill shank; a bearing bush in which said drill shank is mounted, said bearing bush having a projecting bearing flange, said resilient element being formed as a resilient O-ring on which said bearing flange lies; means for rotating said displacing element at a speed which is lower than a speed of said drill shank, said means for rotating include a common drive motor and a belt drive assembly driven by said common drive motor and driving said displacement element with said speed which is lower than said speed of said drill shank; a further rotatable ring from which said displacement element projects and which is driven by said drive motor; and an additional bearing for said drill shank, said rotatable ring being arranged coaxially with respect to a center line of said drill shank and rotating on said additional bearing of said drill shank.

2. A device as defined in claim 1; and further comprising a rubber bearing providing said resilient restoring force against which said displacing element displaces said drill shank.

3. A device as defined in claim 1, wherein said displacement element is formed as a roller.

4. A device as defined in claim 1, wherein said displacement element is formed as a bearing element.

5. A device as defined in claim 1, wherein said vertically adjusting means includes a cylinder-piston unit.

* * * * *